(12) United States Patent
Jeong et al.

(10) Patent No.: US 9,158,398 B2
(45) Date of Patent: Oct. 13, 2015

(54) DISPLAY DEVICE HAVING TOUCH SCREEN SENSING FUNCTION

(71) Applicant: SAMSUNG DISPLAY CO., LTD., Yongin-si, Gyeonggi-do (KR)

(72) Inventors: Seung-Heui Jeong, Yongin-si (KR); Hyoung-Wook Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 235 days.

(21) Appl. No.: 13/712,922

(22) Filed: Dec. 12, 2012

(65) Prior Publication Data

US 2014/0022187 A1 Jan. 23, 2014

(30) Foreign Application Priority Data

Jul. 17, 2012 (KR) .......................... 10-2012-0077785

(51) Int. Cl.
*G06F 3/041* (2006.01)
*G06F 3/046* (2006.01)

(52) U.S. Cl.
CPC ................ *G06F 3/041* (2013.01); *G06F 3/046* (2013.01)

(58) Field of Classification Search
CPC ....... G06F 3/0412; G06F 3/044; G06F 3/046; G06F 2203/04103; G06F 2203/04106; G06F 2203/04107; G06F 2203/04111
USPC ...................... 178/18.01–19.07; 345/173–178
See application file for complete search history.

(56) References Cited

U.S. PATENT DOCUMENTS

| 7,755,616 | B2 | 7/2010 | Jung et al. |
| 2004/0155871 | A1 | 8/2004 | Perski et al. |
| 2006/0164402 | A1 | 7/2006 | Tobari |
| 2007/0018969 | A1 | 1/2007 | Chen et al. |
| 2007/0117415 | A1 | 5/2007 | Shikina |
| 2007/0200487 | A1 | 8/2007 | Uno |
| 2008/0018613 | A1 | 1/2008 | Kim et al. |
| 2008/0303774 | A1 | 12/2008 | Yoshinaga et al. |
| 2009/0115743 | A1 | 5/2009 | Oowaki |
| 2010/0171891 | A1 | 7/2010 | Kaji et al. |
| 2010/0265206 | A1 | 10/2010 | Chen |
| 2010/0321327 | A1 | 12/2010 | Liu |
| 2012/0086661 | A1* | 4/2012 | Shi et al. ....................... 345/173 |

(Continued)

FOREIGN PATENT DOCUMENTS

| JP | 2002-182197 A | 6/2002 |
| JP | 2004-272365 A | 9/2004 |
| JP | 2005-173709 A | 6/2005 |

(Continued)

OTHER PUBLICATIONS

Korean Patent Abstracts No. 10-2005-0057066 A for Patent No. KR 10-1006877, 1 page.

(Continued)

*Primary Examiner* — Michael Pervan
(74) *Attorney, Agent, or Firm* — Christie, Parker & Hale, LLP (57) ABSTRACT

A display device including a plurality of pixels at a display region of a first substrate, and an electromagnetic resonance (EMR) sensor unit at one surface of the first substrate, the EMR sensor unit including a first group of coils and a second group of coils, the first group of coils and the second group of coils being laminated, wherein the EMR sensor unit is beneath the plurality of pixels.

27 Claims, 5 Drawing Sheets

(56) References Cited

U.S. PATENT DOCUMENTS

2012/0169642 A1* 7/2012 Lee .............................. 345/173
2012/0255850 A1* 10/2012 Shimizu ....................... 200/600

FOREIGN PATENT DOCUMENTS

| | | |
|---|---|---|
| JP | 2006-208563 A | 8/2006 |
| JP | 2007-48279 A | 2/2007 |
| JP | 2007-115146 | 5/2007 |
| JP | 2007-257619 A | 10/2007 |
| JP | 2009-116090 | 5/2009 |
| JP | 3154829 U | 10/2009 |
| KR | 10-2004-0084503 | 10/2004 |
| KR | 10-2004-0084504 | 10/2004 |
| KR | 10-2008-0007812 A | 1/2008 |
| KR | 10-2010-0038067 A | 4/2010 |
| KR | 10-1006877 | 1/2011 |
| KR | 10-1073309 | 10/2011 |
| TW | I288826 | 10/2007 |
| TW | I340015 | 4/2011 |
| TW | M425329 | 3/2012 |
| WO | WO 2008/143212 A1 | 11/2008 |

OTHER PUBLICATIONS

Korean Patent Abstracts No. 10-2011-0057501 A for Patent No. KR 10-1073309, 1 page.
KIPO Notice of Allowance dated Apr. 23, 2014, for Korean priority Patent application 10-2012-0077785, (1 page).
Japanese Office action dated Dec. 3, 2013, for corresponding Japanese Patent application 2012-224958 (3 pages).
Office Action dated Sep. 26, 2013 for corresponding Korean priority Application No. 10-2012-0077785, 4 pages.
Taiwan Office action dated Feb. 16, 2015, for corresponding Taiwan Patent application 102101579, (4 pages).
English machine translation of Taiwan Publication TW I340015 dated Apr. 1, 2011, listed above, (4 pages).
English machine translation of Taiwan Publication TW M425329 dated Mar. 21, 2012, listed above, (18 pages).
JPO Notice of Allowance dated Oct. 7, 2014, for corresponding Japanese Patent application 2012-224958, (3 pages).

* cited by examiner

DISPLAY DEVICE HAVING TOUCH SCREEN SENSING FUNCTION

CROSS-REFERENCE TO RELATED APPLICATION

This application claims priority to and the benefit of Korean Patent Application No. 10-2012-0077785, filed on Jul. 17, 2012 in the Korean Intellectual Property Office, the entire content of which is incorporated herein by reference.

BACKGROUND

1. Field

Embodiments of the present invention relate to a display device capable of sensing touch.

2. Description of the Related Art

Touch screen panels are used as input units of smart phones and smart pads, which are currently widely used. A touch screen panel is an input device capable of enabling the selection of information or content displayed on a screen of a display device by using a user's finger to input the user's command. Therefore, the touch screen panel is provided on a front face of the display device to convert a contact position of the user's finger into an electrical signal. Therefore, the instruction contact selected by the contact position is received as an input signal.

Since the touch screen panel may replace other input devices coupled to the image display device, such as a keyboard and a mouse, the use range thereof is increasing.

Methods of realizing a touch screen panel include a resistance layer method, a photo-sensing method, and an electro-capacitive method. Among the above methods, the electro-capacitive touch screen panel is widely used, and detects change in capacitance between conductive sensing patterns and other peripheral sensing patterns or a ground electrode when the finger contacts the touch screen panel, thereby converting the contact position into the electrical signal.

The electro-capacitive touch screen panel is commonly attached to the external surface of a display device, such as a liquid crystal display (LCD) and an organic light emitting display (OLED). However, since an additional touch screen panel is attached to the display device, the overall thickness and manufacturing cost of the display device increase, and visibility of an image deteriorates due to a gap between the touch screen panel and a display panel.

In addition, since a display device driving integrated circuit (IC) and a touch screen panel driving IC are additionally provided, products are not easily compatible with each other. Since the display device driving IC and the touch screen panel driving IC are coupled to separate flexible printed circuit boards (FPCB), respectively, manufacturing processes are complicated and product cost increases.

In addition, recently, a pen enabling a pen input function capable of performing more delicate or more precise work, as compared to that of a finger touch, are increasingly desired. A pen applied to the conventional electro-capacitive touch screen panel generates a specific signal by internal battery power supply, and the sensing electrodes of the touch screen panel sense the signal. However, since a battery is mounted in the pen, the size of the pen increases, and the battery must be changed periodically.

SUMMARY

Accordingly, embodiments of the present invention provide a display device in which an electromagnetic resonance (EMR) sensor unit for sensing the contact of a stylus pen is formed on one surface of a substrate to reduce or minimize the thickness of the display device and to sense a touch more precisely.

Embodiments of the present invention also provide a display device in which the EMR sensor unit and the display device are coupled to a single flexible printed circuit board (FPCB) to simplify manufacturing processes and to reduce product cost.

Embodiments of the present invention also provide a display device whose top substrate is used as the substrate of a touch screen panel to reduce or minimize the thickness of the display device, and to improve visibility of an image.

To achieve the foregoing and/or other aspects of embodiments of the present invention, according to one embodiment of the present invention, there is provided a display device including a plurality of pixels at a display region of a first substrate, and an electromagnetic resonance (EMR) sensor unit at one surface of the first substrate, the EMR sensor unit including a first group of coils and a second group of coils, the first group of coils and the second group of coils being laminated, wherein the EMR sensor unit is beneath the plurality of pixels.

The EMR sensor unit may further include an insulating layer on a front face of the first group of coils, and a planarized buffer layer on the second group of coils, the first group of coils may be directly on one surface of the first substrate, and the second group of coils may be on the insulating layer and may be arranged in a direction that crosses the first group of coils.

The plurality of pixels may be at the buffer layer.

The EMR sensor unit may be wider than the display region of the first substrate.

The first group of coils and the second groups of coils may include first coils and second coils arranged in a first direction and a second direction, respectively, and the first and second coils may include first terminals coupled to a ground power supply, and second terminals coupled to an EMR pad unit coupled to an EMR IC.

The first coils and the second coils may include a patterned low resistance colored metal.

The display device may further include a shield layer at a bottom surface of the first substrate.

The first substrate may be transparent and may include a glass substrate or a material having a flexible characteristic.

The first substrate may include polyimide.

According to another embodiment of the present invention, there is provided a display device having a touch sensing function, the display device including a plurality of pixels at a display region of a first substrate, signal lines coupled to the plurality of pixels and located at a non-display region at an outline of the display region of the first substrate, an EMR sensor unit between a top surface of the first substrate and a bottom surface of the plurality of pixels, the EMR sensor unit including a first group of coils and a second group of coils, the first group of coils and the second group of coils being laminated, a driving pad unit electrically coupled to the signal lines and located at one end of the non-display region, and an EMR pad unit at a same surface as the driving pad unit to be adjacent the driving pad unit and electrically coupled to the EMR sensor unit.

The driving pad unit and the EMR pad unit may be electrically coupled to a flexible printed circuit board (FPCB).

The EMR sensor unit may further include an insulating layer on a front surface of the first group of coils, and a planarizing buffer layer on the second group of coils, and the first group of coils may be directly on one surface of the first substrate, and the second group of coils may be on the insulating layer and arranged in a direction that crosses the first group of coils.

The first group of coils and the second group of coils may include first coils and second coils arranged in a first direction and a second direction, respectively, and the first coils and the second coils may include first terminals coupled to a ground power supply, and second terminals coupled to the EMR pad unit coupled to an EMR IC.

First lines and second lines extending from the first group of coils and the second group of coils may be electrically coupled to pads of the EMR pad unit through a contact hole.

According to another embodiment of the present invention, there is provided a display device having a touch sensing function, the display device including a plurality of pixels at a display region of a first substrate, signal lines coupled to the plurality of pixels and located at a non-display region at an outline of the display region of the first substrate, an EMR sensor unit between a top surface of the first substrate and a bottom surface of the plurality of pixels, and including a first group of coils and a second group of coils, the first group of coils and the second group of coils being laminated, a second substrate on the first substrate to seal the first substrate, the second substrate having a display region and a non-display region at the outline of the display region of the second substrate, a plurality of sensing patterns at the display region of the second substrate, a plurality of sensing lines coupled to sensing patterns and located at the non-display region of the second substrate, and a sealing material at an edge of the non-display region of the second substrate to couple the first substrate and the second substrate to each other.

The display device may further include a first touch pad unit at the non-display region of the second substrate and overlapping the sealing material to be electrically coupled to a plurality of sensing lines.

The display device may further include a driving pad unit at one end of the non-display region of the first substrate to be electrically coupled to the signal lines, an EMR pad unit at a same surface as, and next to, the driving pad unit, and electrically coupled to the EMR sensor unit, and a second touch pad unit at the same surface as, and next to, the driving pad unit, and electrically coupled to the first touch pad unit.

A plurality of pads of the first touch pad unit may be electrically coupled to pads of the second touch pad unit through a plurality of conductive media in the sealing material.

The driving pad unit, the EMR pad unit, and the second touch pad unit may be electrically coupled to a flexible printed circuit board (FPCB).

The EMR sensor unit may further include an insulting layer on a front face of the first group of coils, and a planarized buffer layer on the second group of coils, and the first group of coils may be directly on one surface of the first substrate, and the second group of coils may be on the insulating layer and may be arranged in a direction that crosses the first group of coils.

The first group of coils and the second group of coils may include first coils and second coils arranged in a first direction and a second direction, respectively, and the first coils and the second coils may include first terminals coupled to a ground power supply, and second terminals coupled to an EMR pad unit coupled to an EMR IC.

First lines and second lines extending from the first group of coils and the second group of coils may be electrically coupled to pads of the EMR pad unit through a contact hole.

The sensing patterns may include first sensing cells coupled by row line in a first direction, first coupling lines for coupling the first sensing cells in the first direction, second sensing cells coupled by column line in a second direction, and second coupling lines for coupling the second sensing cells in the second direction.

The sensing patterns may be at a same layer.

The second sensing cells may be integrated with the second coupling lines.

The display device may further include an insulating layer at crossing regions of the first coupling lines and the second coupling lines.

The sensing patterns are at an internal surface of the second substrate that faces the first substrate.

In embodiments of the present invention, the EMR sensor unit for sensing contact of the stylus pen is formed on one surface of the substrate of the display device to reduce or minimize the thickness of the display device, and to sense a touch more precisely.

In addition, the EMR sensor unit and the display device are coupled to one FPCB so that it is possible to simplify manufacturing processes and to reduce product cost.

In addition, the top substrate of the display device may also be used as the substrate of the touch screen panel. The touch screen panel and the EMR sensor unit are mounted on the top and bottom of the display device, respectively. Therefore, it is possible to reduce or minimize the thickness of the display device, to improve visibility of an image, and to sense a touch more precisely.

BRIEF DESCRIPTION OF THE DRAWINGS

The accompanying drawings, together with the specification, illustrate exemplary embodiments of the present invention, and, together with the description, serve to explain aspects of the present invention.

DETAILED DESCRIPTION

In the following detailed description, only certain exemplary embodiments of the present invention have been shown and described, simply for the purpose of illustration. As those skilled in the art would realize, the described embodiments may be modified in various ways, all without departing from the spirit or scope of the present invention. Accordingly, the drawings and description are to be regarded as illustrative in nature, and not restrictive. In addition, when an element is referred to as being "on" another element, it can be directly on the other element, or can be indirectly on the other element with one or more intervening elements interposed therebetween. Also, when an element is referred to as being "connected to" or "coupled to" another element, it can be directly connected to another element or be indirectly connected to the other element with one or more intervening elements interposed therebetween. Hereinafter, like reference numerals refer to like elements.

Hereinafter, embodiments of the present invention will be described in detail with reference to the accompanying drawings.

In the present embodiment of the present invention, an electromagnetic resonance (EMR) sensor unit is formed on one surface of the bottom substrate of a display device, and an electro-capacitive touch screen panel is formed on one surface of the top substrate of the display device, so that the entire thickness of the display device may be reduced or minimized, and so that contact or touch by a passive stylus pen (e.g., a stylus pen having no battery) and/or a finger may be sensed.

According to the present embodiment, the display device may be, for example, a liquid crystal display (LCD) or an organic light emitting display (OLED). Since the OLED may have a flexible characteristic, the OLED may be used as the display device according to the present embodiment. Therefore, in describing the present embodiment, the OLED is taken as an example.

Figure 1:
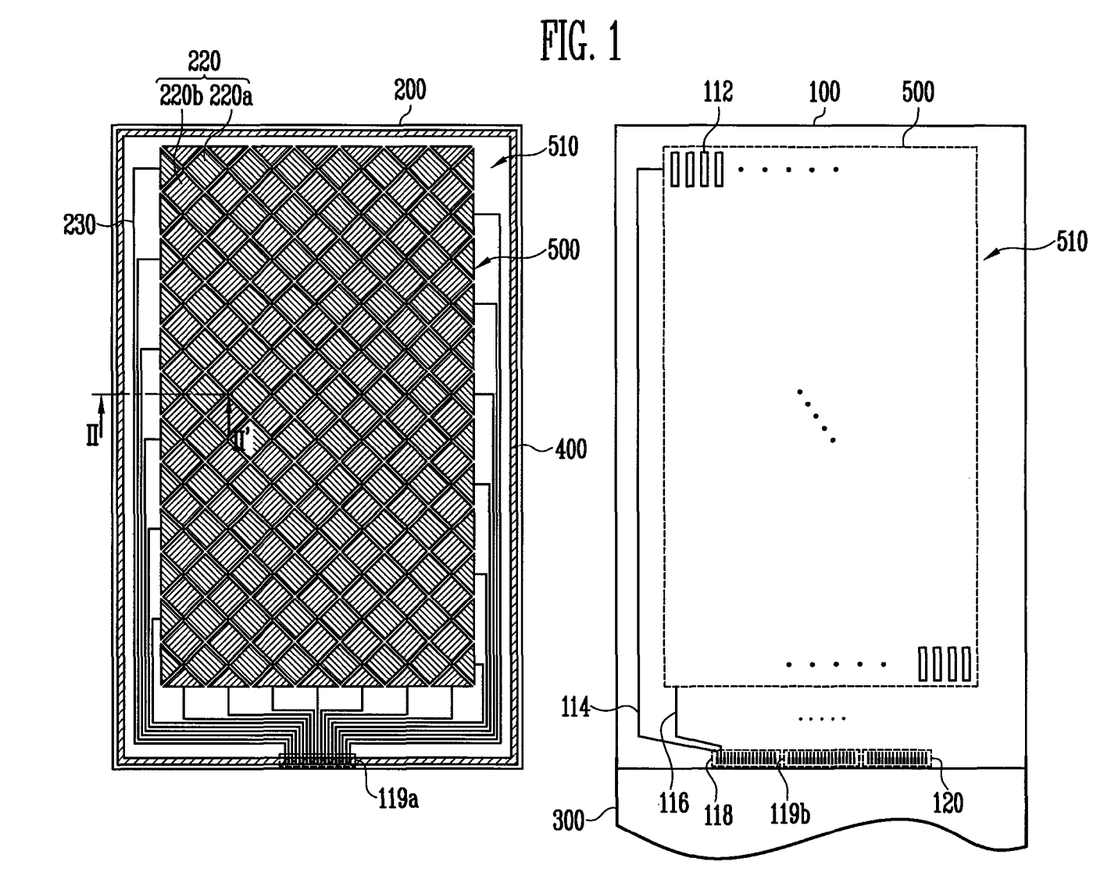
FIG. 1 is an exploded plan view of a display device according to an embodiment of the present invention.
Figure 2A:
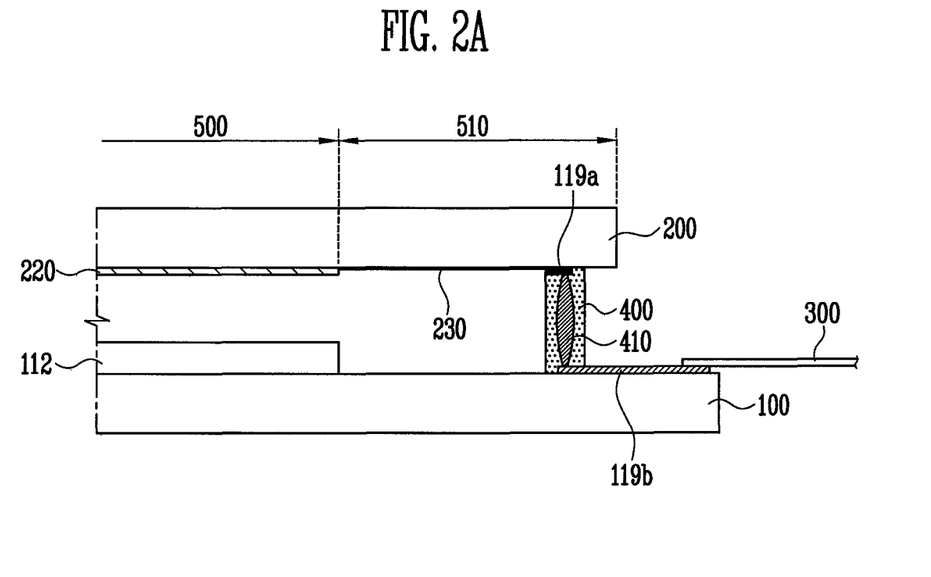
FIGS. 2A and 2B are sectional views illustrating a coupling type of the pad units of the embodiment illustrated in FIG. 1.
Figure 2B:
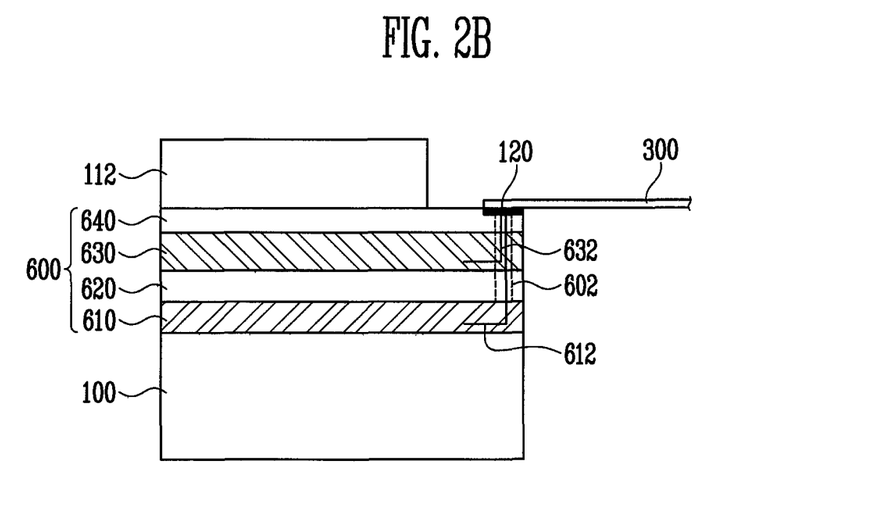

FIG. 1 is an exploded plan view of a display device according to the present embodiment of the present invention. FIGS. 2A and 2B are sectional views illustrating a coupling type of the pad units of the embodiment illustrated in FIG. 1.

The present embodiment is applied to an OLED in which a touch screen panel and an EMR sensor unit are integrated with each other. Sensing patterns and sensing lines for realizing the touch screen panel are directly formed on one surface of the top substrate 200 of the OLED, and a first group of coils and a second group of coils that are part of the EMR sensor unit are directly formed on one surface of the bottom substrate 100 of the OLED.

In the present embodiment, the top substrate 200 that functions as the encapsulating substrate of the OLED may be formed of, for example, a glass material or a thin film having a flexible characteristic. In addition, one surface of the top substrate 200 may be the internal surface of the top substrate. Therefore, one surface of the top substrate illustrated in FIG. 1 corresponds to the internal surface of the top substrate.

The above is only one embodiment, and the present invention is not limited to the above. That is, sensing patterns 220 of the touch screen panel may be formed on the external surface of the top substrate 200, and/or may be formed on the internal and external surfaces of the top substrate.

In addition, in the present embodiment, the EMR sensor unit is mounted on the bottom substrate 100. When a passive stylus pen including a resonance circuit contacts the display device, coils in the EMR sensor unit adjacent the contact position form a magnetic field. The EMR sensor unit senses the resonance frequency of the resonance circuit, the resonance frequency being generated by the resonance circuit resonating with the magnetic field, to determine the contact position.

The structure of the display device according to the present embodiment will be described in detail with reference to FIG. 1.

In the display device according to the present embodiment, sensing patterns 220 of a touch screen panel, and sensing lines 230 for coupling the sensing patterns 220 to an external touch integrated circuit (IC) (not shown) through a first touch pad unit 119a, are formed on one surface of a top substrate 200 that seals a bottom substrate 100 with respect to a plurality of pixels 112 formed in a display region 500 of the bottom substrate 100. Also an EMR sensor unit (not shown) realized by a lamination structure of a first group of coils (not shown) and a second group of coils (not shown) is formed on one surface of the bottom substrate 100 where the plurality of pixels 112 are formed. That is, the EMR sensor unit is directly formed on one surface of the bottom substrate 100, and the plurality of pixels 112 are formed on a region that overlaps the EMR sensor unit.

In the present embodiment, the sensing patterns 220 are formed on the display region 500 of the top substrate 200, the sensing lines 230 are formed on a non-display region 510 positioned on the outline of the display region 500, and a sealing material 400 for attaching the top substrate 200 to the bottom substrate 100 is coated at the edge of the non-display region 510.

In addition, a plurality of signal lines 114 and 116 are coupled to the pixels 112 formed on the display region 500 of the bottom substrate 100, and the signal lines 114 and 116 are arranged on the non-display region 510.

In FIG. 1, scan lines 114 and data lines 116 are arranged as the signal lines. However, emission control lines for controlling emission of organic light emitting diodes (OLED) provided in pixels may also be provided.

In the present embodiment, the pixels include OLEDs that are self-emissive elements, a plurality of transistors, and at least one capacitor.

As illustrated in FIG. 1, the signal lines 114 and 116 are coupled to a driving pad unit 118 provided at one end of the non-display region 510 of the bottom substrate 100 to receive signals from an external driving IC (not shown) mounted on a flexible printed circuit board (FPCB) 300.

In addition, a second touch pad unit 119b and an EMR pad unit 120 are adjacently located on side surfaces of the driving pad unit 118, respectively. The EMR sensor unit is electrically coupled to the EMR pad unit 120. The first touch pad unit 119a formed on the top substrate 200 is electrically coupled to the second touch pad unit 119b.

Coupling of the first touch pad unit 119a formed on the top substrate 200 to the second touch pad unit 119b formed on the bottom substrate 100 may be realized by the present embodiment illustrated in FIG. 2A. That is, the first touch pad unit 119a on the top substrate overlaps the sealing material 400, and a plurality of pads that form the first touch pad unit 119a are electrically coupled to the pads of the second touch pad unit 119b, which are located at one end of the non-display region of the bottom substrate, through a plurality of conductive media (for example, a conductive ball/conductive member 410) provided in the sealing material 400.

Next, as illustrated in FIG. 2B, in an EMR sensor unit 600 directly formed on one surface of the bottom substrate 100, a plurality of first lines 612 withdrawn from a first group of coils 610, and a plurality of second lines 632 withdrawn from a second group of coils 630, are electrically coupled to the pads of the EMR pad unit 120 located at one end of the non-display region of the bottom substrate 100 through a contact hole 602.

The EMR sensor unit 600 has a structure in which a first group of coils 610 are directly patterned on one surface of the bottom substrate 100, an insulating layer 620 formed on the front face of the bottom substrate 100 including the first group of coils 610 (e.g., on the front face of the first group of coils 610), a second group of coils 630 formed on the insulating layer 620 to be arranged in a direction that crosses the first group of coils 610, and a buffer layer 640 (e.g., a planarized buffer layer 640) formed on the second group of coils 630 to planarize a surface, are sequentially laminated. The structure of the EMR sensor unit will be described in detail with reference to FIGS. 3 and 4.

In the above-described structure, the pad units provided at one end of the non-display region 510 of the bottom substrate 100, that is, the driving pad unit 118, the second touch pad unit 119b, and the EMR pad unit 120 are electrically coupled to the same FPCB 300.

In addition, a driving IC (not shown) for driving a plurality of pixels (not shown) in the pixel region of the bottom substrate 100, a touch IC (not shown) for controlling the operations of the sensing patterns 220 on the top substrate 200, and an EMR IC (not shown) for controlling the operation of the EMR sensor unit 600 on one surface of the bottom substrate may be mounted on the FPCB 300. In the present embodiment, the driving IC, the touch IC, and the EMR IC may be realized by separate ICs, or may be realized by an integrated IC for realizing all of the functions. In the present embodiment, the FPCB 300 is integrated into one to simplify bonding and testing processes of the FPCB 300 and to reduce or minimize manufacturing processes and product cost.

In the present embodiment, as described above, the EMR sensor unit is directly on one surface of the bottom substrate of the display device.

Figure 3A:
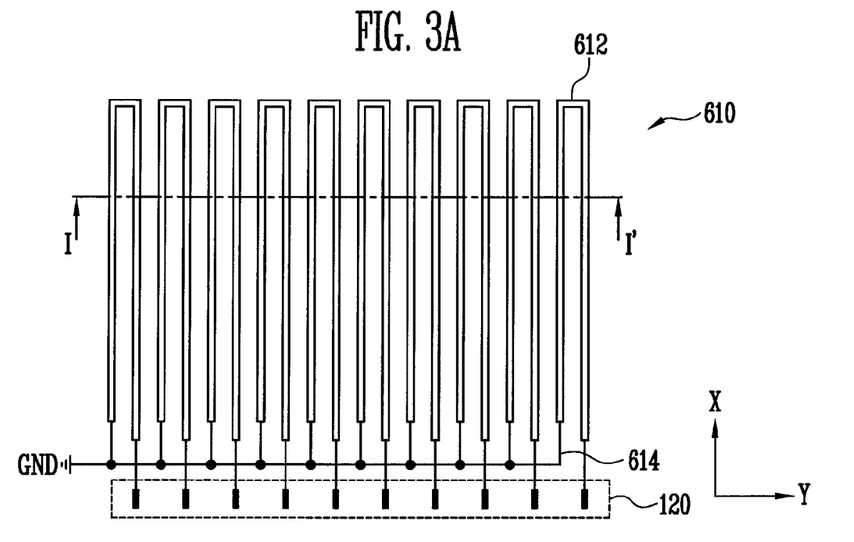
FIGS. 3A and 3B are plan views illustrating the structure of the EMR sensor unit of the embodiment illustrated in FIG. 1.
Figure 3B:
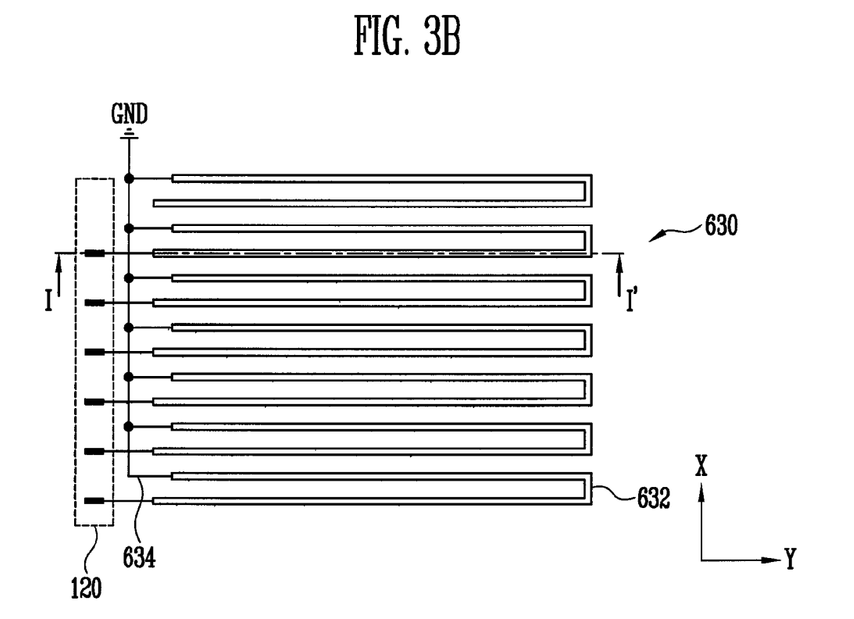

FIGS. 3A and 3B are plan views illustrating the structure of the EMR sensor unit illustrated in FIG. 1. FIG. 3A illustrates an arrangement type of the first group of coils 610. FIG. 3B illustrates an arrangement type of the second group of coils 630.

Figure 4:
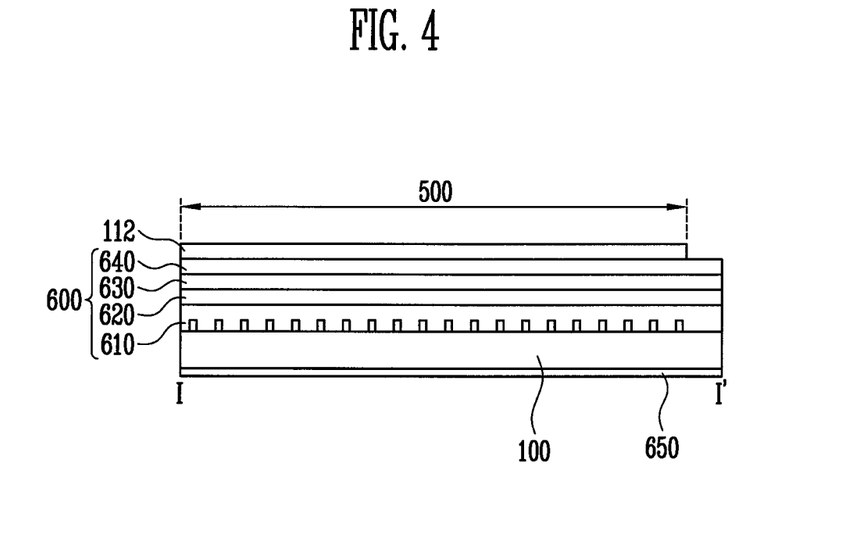
FIG. 4 is a sectional view taken along the line I-I' of a bottom substrate according to the embodiment of the present invention illustrated in FIG. 3.

FIG. 4 is a sectional view taken along the line I-I' of a bottom substrate according to the present embodiment of the present invention.

First, referring to FIG. 3A, the first group of coils 610 of the EMR sensor unit 600 is arranged in a direction (e.g., an X-axis direction). In the first group of coils 610, a plurality of first coils 612, one side of each of which being opened, are formed on the bottom substrate 100 at substantially uniform intervals.

The first terminals of the first coils 612 are coupled to an external ground power supply GND through a ground line 614. The second terminals of the first coils 612 are coupled to the EMR IC mounted on the FPCB 300 through the above-described EMR pad unit 120. When a stylus pen makes contact, the first coil 612 in the first group of coils 610 that is most adjacent the contact position is selected so that a voltage (e.g., a voltage in a predetermined level) is applied to the first coil 612.

In the present embodiment, a transmission and reception converter (not shown) and a multiplexer (not shown) coupled thereto are provided in the EMR IC. During a transmission operation, the signal corresponding to a sensed touch position is transmitted to a controller in the EMR IC through a first multiplexer coupled to the second terminals and the transmission and reception converter. During a reception operation, the contact position of the stylus pen may be sensed.

Similarly, referring to FIG. 3B, the second group of coils 630 of the EMR sensor unit is arranged in a direction that crosses the first group of coils 610, that is in a direction (e.g., a Y-axis direction). A plurality of second coils 632, each side of which being opened, is formed having uniform intervals on the insulating layer 620.

The first terminals of the second coils 632 are coupled to an external ground power supply GND through a ground line 634, and the second terminals of the second coils 632 are coupled to the EMR IC mounted on the FPCB through the above-described EMR pad unit 120. When a stylus pen makes a contact, the second coil 632 in the second group of coils 630, the second coil 632 being most adjacent the contact position, is selected so that a voltage (e.g., a voltage in a predetermined level) is applied to the second coil.

In the present embodiment, a transmission and reception converter and a multiplexer coupled thereto are provided in the EMR IC. During a transmission operation, the signal whose touch position is sensed is transmitted to a controller in the EMR IC through a second multiplexer coupled to the second terminals and the transmission and reception converter. During a reception operation, the contact position of the stylus pen may be sensed.

Here, the transmission and reception converter selects an operation mode in which the first group of coils 610 and the second group of coils 630 are the same.

The touch sensing operation of the passive stylus that is performed by the EMR sensor unit 600 will be briefly described as follows. The EMR sensor unit 600 receives a signal from the controller provided in the EMR IC to operate. Coils (e.g., specific coils) in the first and second groups of coils 610 and 630 are selected to induce electromagnetism and to generate an electronic wave.

A passive stylus pen (not shown), in which a resonance circuit is provided, is resonated by the electronic wave to hold a resonance frequency for a substantially uniform time, and the EMR sensor unit 600 receives the resonance frequency to sense the contact position of the stylus pen.

Here, in the resonance circuit provided in the passive stylus pen as an RLC complex circuit, maximum current flows at a specific frequency of an applied power supply. The resonance frequency might extract only the output characteristic of a specific frequency.

Referring to FIG. 4, the EMR sensor unit 600 according to the present embodiment has a structure in which the first group of coils 610 formed to be directly patterned on one surface of the bottom substrate 100, the insulating layer 620 formed on the front face of the bottom substrate 100 including the first group of coils 610 (e.g., on the front face of the first group of coils 610), the second group of coils 630 formed on the insulating layer 620 to be arranged in a direction that crosses the first group of coils 610, and the buffer layer 640 formed on the second group of coils 630 to planarize a surface, are sequentially laminated. A shield layer 650 is formed on the bottom surface of the bottom substrate 100.

The bottom substrate 100 may be formed of, for example, a glass substrate or a material having a flexible characteristic as a transparent material. For example, polyimide (PI) as a transparent material having high heat resistance and chemical resistance may be used as the flexible material.

The plurality of pixels 112 on the bottom substrate 100, and the plurality of signal lines coupled to the pixels, are formed on the buffer layer 640.

Since the EMR sensor unit 600 is provided on one surface of the bottom substrate 100 of the organic light emitting display that operates in a top emission method, that is, under the plurality of pixels 112, the structure of the EMR sensor unit 600 does not prevent the display device from displaying an image.

Therefore, in the present embodiment, the coils 612 and 632 that form the first and second groups of coils 610 and 630, respectively, are formed by patterning low resistance colored metal to maximize the performance of the EMR sensor unit 600.

In addition, it is relatively easy for a user to draw a desired figure as the area of the EMR sensor unit 600 is relatively larger. Therefore, the EMR sensor unit 600 according to the present embodiment is larger than the display region 500 of the bottom substrate 100.

In addition, in the present embodiment, as described above, the touch screen panel is directly formed on one surface of the top substrate 200 of the display device.

Figure 5:
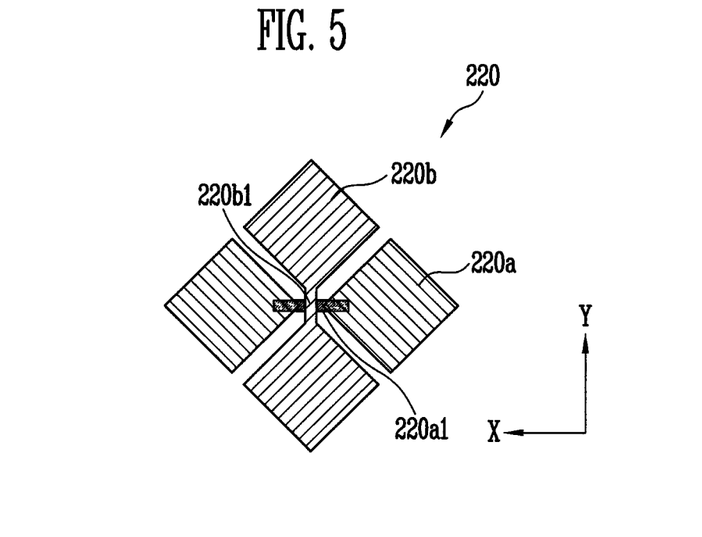
FIG. 5 is an enlarged view of a main part illustrating an example of the sensing pattern of the embodiment illustrated in FIG. 1.
Figure 6:
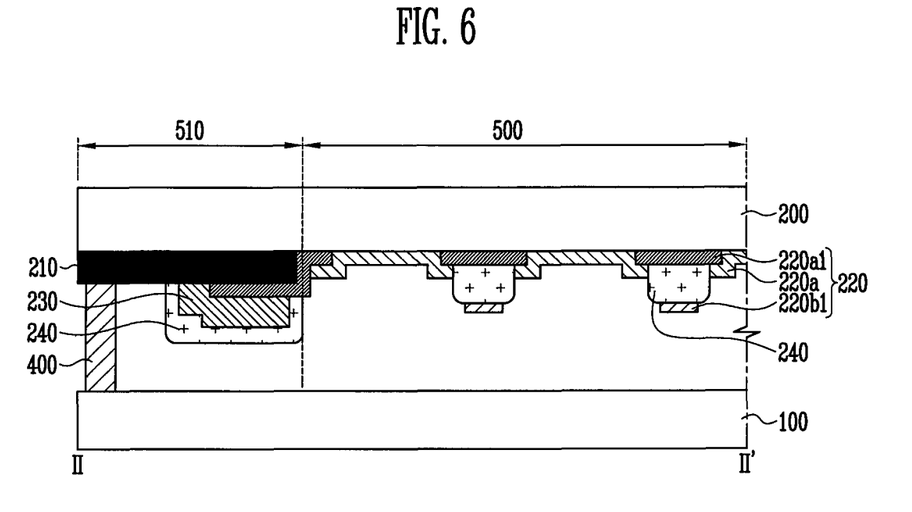
FIG. 6 is a sectional view taken along the line II-II' of the top substrate of the embodiment illustrated in FIG. 1.

FIG. 5 is an enlarged view of a main part illustrating an example of the sensing pattern of the embodiment illustrated in FIG. 1. FIG. 6 is a sectional view taken along the line II-II' of the top substrate of the embodiment illustrated in FIG. 1.

The structure of the touch screen panel according to the present embodiment will be described in detail with reference to FIGS. 1, 5, and 6.

As illustrated in FIG. 5, the sensing patterns 220 include a plurality of first sensing cells 220*a* formed to be coupled by row line in a first direction (e.g., the X-axis direction), first coupling lines 220*a*1 for coupling the first sensing cells 220*a* in the first direction, second sensing cells 220*b* formed to be coupled by column line in a second direction (e.g., the Y-axis direction), and second coupling lines 220*b*1 for coupling the second sensing cells 220*b* in the second direction.

The first sensing cells 220*a* and the second sensing cells 220*b* are alternately arranged so as to not overlap each other. The first coupling lines 220*a*1 and the second coupling lines 220*b*1 cross each other. An insulating layer (not shown) for securing stability is interposed between the first coupling lines 220*a*1 and the second coupling lines 220*b*1.

On the other hand, the first sensing cells 220*a* and the second sensing cells 220*b* are integrated with the first coupling lines 220*a*1 and the second coupling lines 220*b*1, respectively, using a transparent electrode material such as, for example, indium tin oxide (ITO), or are formed to be separated from the first coupling lines 220*a*1 and the second coupling lines 220*b*1 to be electrically coupled.

For example, the second sensing cells 220*b* are patterned to be integrated with the second coupling lines 220*b*1 in the second direction, and the first sensing cells 220*a* are patterned among the second sensing cells 220*b* to have independent patterns and may be coupled by the first coupling lines 220*a*1 positioned on or under the first sensing cells 220*a* in the first direction.

In the present embodiment, the first coupling lines 220*a*1 directly contact the first sensing cells 220*a* on or under the first sensing cells 220*a* to be electrically coupled, or may be directly coupled to the first sensing cells 220*a* through a contact hole.

The first coupling lines 220*a*1 may be formed of a transparent electrode material such as, for example, ITO or an opaque low resistance material, so that the width of the first coupling lines 220*a*1 prevents the patterns from being noticeable.

The sensing lines 230 are electrically coupled to the first and second sensing cells 220*a* and 220*b* in units of row and column lines to couple the first and second sensing cells 220*a* and 220*b* to an external touch IC (not shown), such as a position detecting circuit, through a first bonding pad unit 20*a*.

The sensing lines 230 are arranged in a non-display region 510*a* positioned on the outline of a display region where an image is displayed. The range of choice of materials of the sensing lines 230 is wide so that the sensing lines 230 may be formed of low resistance materials such as, for example, Mo, Ag, Ti, Cu, Ti, and Mo/Al/Mo other than a transparent electrode material used for forming the sensing patterns 220.

When a finger contacts the above-described electro-capacitive touch screen panel, a change in capacitance in accordance with the contact position is transmitted from the sensing patterns 220 to a touch IC (not shown) via the sensing lines 230 and the first and second touch pad units 119*a* and 119*b*. Then, a change in capacitance is converted into an electrical signal through an X and Y input processing circuit in the touch IC so that the contact position is sensed.

In addition, FIG. 6 is a sectional view taken along the line II-II' of the top substrate of the embodiment illustrated in FIG. 1. Referring to FIG. 6, as described above, the sensing patterns 220 formed on the display region 500 of the top substrate 200 include the first sensing cells 220*a* formed to be coupled by row line in a row direction (e.g., the first direction), the first coupling lines 220*a*1 for coupling the first sensing cells 220*a* in the row direction, the second sensing cells 220*b* formed to be coupled by column line in a column direction, and the second coupling lines 220*b*1 for coupling the second sensing cells 220*b* in the column direction. An insulating layer 240 is interposed at crossing regions of the first coupling lines 220*a*1 and the second coupling lines 220*b*1.

In addition, in the non-display region 510 of the top substrate 200 positioned on the outline of the display region 500, a black matrix 210 is formed, the sensing lines 230 electrically coupled to the sensing patterns 220 are formed with respect to the non-display region 510 that overlaps the black matrix, and the sealing material 400 is formed to attach the top substrate 200 to the bottom substrate 100.

In the present embodiment, the black matrix 210 prevents the patterns such as the sensing lines formed in the non-display region 510 from being noticeable and forms the frame of the display region.

While embodiments of the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device comprising:
   a plurality of pixels at a display region of a first substrate; and
   an electromagnetic resonance (EMR) sensor unit at one surface of the first substrate, the EMR sensor unit comprising a first group of metal coils and a second group of metal coils, the first group of metal coils and the second group of metal coils being laminated,
   wherein the EMR sensor unit is beneath the plurality of pixels.

2. The display device as claimed in claim 1,
   wherein the EMR sensor unit further comprises:
      an insulating layer on a front face of the first group of metal coils; and
      a planarized buffer layer on the second group of metal coils,
   wherein the first group of metal coils is directly on one surface of the first substrate, and
   wherein the second group of metal coils is on the insulating layer and is arranged in a direction that crosses the first group of metal coils.

3. The display device as claimed in claim 2, wherein the plurality of pixels are at the buffer layer.

4. The display device as claimed in claim 3, wherein the EMR sensor unit is wider than the display region of the first substrate.

5. The display device as claimed in claim 2,
   wherein the first group of metal coils and the second groups of metal coils comprise first coils and second coils arranged in a first direction and a second direction, respectively, and wherein the first and second coils comprises:
  first terminals coupled to a ground power supply; and
  second terminals coupled to an EMR pad unit coupled to an EMR IC.

6. The display device as claimed in claim 5, wherein the first coils and the second coils comprise a patterned low resistance colored metal.

7. The display device as claimed in claim 1, further comprising a shield layer at a bottom surface of the first substrate.

8. The display device as claimed in claim 1, wherein the first substrate is transparent and comprises a glass substrate or a material having a flexible characteristic.

9. The display device as claimed in claim 8, wherein the first substrate comprises polyimide.

10. A display device having a touch sensing function, the display device comprising:
  a plurality of pixels at a display region of a first substrate;
  signal lines coupled to the plurality of pixels and located at a non-display region at an outline of the display region of the first substrate;
  an EMR sensor unit between a top surface of the first substrate and a bottom surface of the plurality of pixels, the EMR sensor unit comprising a first group of coils and a second group of coils, the first group of coils and the second group of coils being laminated;
  a driving pad unit electrically coupled to the signal lines and located at one end of the non-display region; and
  an EMR pad unit at a same surface as the driving pad unit to be adjacent the driving pad unit and electrically coupled to the EMR sensor unit.

11. The display device as claimed in claim 10, wherein the driving pad unit and the EMR pad unit are electrically coupled to a flexible printed circuit board (FPCB).

12. The display device as claimed in claim 10, wherein the EMR sensor unit further comprises:
  an insulating layer on a front surface of the first group of coils; and
  a planarizing buffer layer on the second group of coils,
wherein the first group of coils are directly on one surface of the first substrate, and
wherein the second group of coils are on the insulating layer and arranged in a direction that crosses the first group of coils.

13. The display device as claimed in claim 12,
  wherein the first group of coils and the second group of coils comprise first coils and second coils arranged in a first direction and a second direction, respectively, and
  wherein the first coils and the second coils comprise first terminals coupled to a ground power supply, and second terminals coupled to the EMR pad unit coupled to an EMR IC.

14. The display device as claimed in claim 13, wherein first lines and second lines extending from the first group of coils and the second group of coils are electrically coupled to pads of the EMR pad unit through a contact hole.

15. A display device having a touch sensing function, the display device comprising:
  a plurality of pixels at a display region of a first substrate;
  signal lines coupled to the plurality of pixels and located at a non-display region at an outline of the display region of the first substrate;
  an EMR sensor unit between a top surface of the first substrate and a bottom surface of the plurality of pixels, and comprising a first group of metal coils and a second group of metal coils, the first group of metal coils and the second group of metal coils being laminated;
  a second substrate on the first substrate to seal the first substrate, the second substrate having a display region and a non-display region at the outline of the display region of the second substrate;
  a plurality of sensing patterns at the display region of the second substrate;
  a plurality of sensing lines coupled to sensing patterns and located at the non-display region of the second substrate; and
  a sealing material at an edge of the non-display region of the second substrate to couple the first substrate and the second substrate to each other.

16. The display device as claimed in claim 15, further comprising a first touch pad unit at the non-display region of the second substrate and overlapping the sealing material to be electrically coupled to a plurality of sensing lines.

17. The display device as claimed in claim 15, wherein the EMR sensor unit further comprises:
  an insulting layer on a front face of the first group of metal coils; and
  a planarized buffer layer on the second group of metal coils,
wherein the first group of metal coils are directly on one surface of the first substrate, and
wherein the second group of metal coils are on the insulating layer and arranged in a direction that crosses the first group of coils.

18. The display device as claimed in claim 17,
  wherein the first group of metal coils and the second group of metal coils comprise first coils and second coils arranged in a first direction and a second direction, respectively, and
  wherein the first coils and the second coils comprise first terminals coupled to a ground power supply, and second terminals coupled to an EMR pad unit coupled to an EMR IC.

19. The display device as claimed in claim 15, wherein the sensing patterns comprise:
  first sensing cells coupled by row line in a first direction;
  first coupling lines for coupling the first sensing cells in the first direction;
  second sensing cells coupled by column line in a second direction; and
  second coupling lines for coupling the second sensing cells in the second direction.

20. The display device as claimed in claim 19, wherein the sensing patterns are at a same layer.

21. The display device as claimed in claim 19, wherein the second sensing cells are integrated with the second coupling lines.

22. The display device as claimed in claim 19, further comprising an insulating layer at crossing regions of the first coupling lines and the second coupling lines.

23. The display device as claimed in claim 15, wherein the sensing patterns are at an internal surface of the second substrate that faces the first substrate.

24. A display device having a touch sensing function, the display device comprising:
  a plurality of pixels at a display region of a first substrate;
  signal lines coupled to the plurality of pixels and located at a non-display region at an outline of the display region of the first substrate;
  an EMR sensor unit between a top surface of the first substrate and a bottom surface of the plurality of pixels, and comprising a first group of coils and a second group of coils, the first group of coils and the second group of coils being laminated;
  a second substrate on the first substrate to seal the first substrate, the second substrate having a display region and a non-display region at the outline of the display region of the second substrate;

a plurality of sensing patterns at the display region of the second substrate;

a plurality of sensing lines coupled to sensing patterns and located at the non-display region of the second substrate;

a sealing material at an edge of the non-display region of the second substrate to couple the first substrate and the second substrate to each other;

a first touch pad unit at the non-display region of the second substrate and overlapping the sealing material to be electrically coupled to a plurality of sensing lines;

a driving pad unit at one end of the non-display region of the first substrate to be electrically coupled to the signal lines;

an EMR pad unit at a same surface as, and next to, the driving pad unit, and electrically coupled to the EMR sensor unit; and a second touch pad unit at the same surface as, and next to, the driving pad unit, and electrically coupled to the first touch pad unit.

25. The display device as claimed in claim 24, wherein a plurality of pads of the first touch pad unit are electrically coupled to pads of the second touch pad unit through a plurality of conductive media in the sealing material.

26. The display device as claimed in claim 24, wherein the driving pad unit, the EMR pad unit, and the second touch pad unit are electrically coupled to a flexible printed circuit board (FPCB).

27. A display device having a touch sensing function, the display device comprising:

a plurality of pixels at a display region of a first substrate;

signal lines coupled to the plurality of pixels and located at a non-display region at an outline of the display region of the first substrate;

an EMR sensor unit between a top surface of the first substrate and a bottom surface of the plurality of pixels, and comprising a first group of coils and a second group of coils, the first group of coils and the second group of coils being laminated;

a second substrate on the first substrate to seal the first substrate, the second substrate having a display region and a non-display region at the outline of the display region of the second substrate;

a plurality of sensing patterns at the display region of the second substrate;

a plurality of sensing lines coupled to sensing patterns and located at the non-display region of the second substrate; and a sealing material at an edge of the non-display region of the second substrate to couple the first substrate and the second substrate to each other, wherein the EMR sensor unit further comprises:

an insulting layer on a front face of the first group of coils; and a planarized buffer layer on the second group of coils, wherein the first group of coils are directly on one surface of the first substrate, and wherein the second group of coils are on the insulating layer and arranged in a direction that crosses the first group of coils wherein the first group of coils and the second group of coils comprise first coils and second coils arranged in a first direction and a second direction, respectively, and wherein the first coils and the second coils comprise first terminals coupled to a ground power supply, and second terminals coupled to an EMR pad unit coupled to an EMR IC, and wherein first lines and second lines extending from the first group of coils and the second group of coils are electrically coupled to pads of the EMR pad unit through a contact hole.

\* \* \* \* \*